United States Patent [19]

Hovens et al.

[11] 4,403,853
[45] Sep. 13, 1983

[54] SLIT EXPOSURE DEVICE

[75] Inventors: Petrus J. P. Hovens, Tegelen; Adrianus H. Willemse, Grubbenvorst, both of Netherlands

[73] Assignee: Océ-Nederland B.V., Venlo, Netherlands

[21] Appl. No.: 282,423

[22] Filed: Jul. 13, 1981

[30] Foreign Application Priority Data

Jul. 24, 1980 [NL] Netherlands ................. 8004250

[51] Int. Cl.³ ............... G03G 15/04; G03G 15/28
[52] U.S. Cl. .................................. 355/16; 355/3 BE; 355/8
[58] Field of Search ............ 355/1, 3 R, 3 BE, 8, 355/16

[56] References Cited

U.S. PATENT DOCUMENTS

| | | | |
|---|---|---|---|
| 3,792,924 | 2/1974 | Matsuda et al. | 355/16 X |
| 3,947,115 | 3/1976 | Hamaguchi | 355/8 |
| 3,955,888 | 5/1976 | Kakiuchi et al. | 355/1 |
| 3,958,876 | 5/1976 | Terashima | 355/16 |
| 4,129,373 | 12/1978 | Ogura et al. | 355/1 |
| 4,183,658 | 1/1980 | Winthaegen | 355/3 BE |
| 4,334,762 | 6/1982 | Landa | 355/8 |

FOREIGN PATENT DOCUMENTS 55-135880 10/1980 Japan ................. 355/3 BE

Primary Examiner—Fred L. Braun
Attorney, Agent, or Firm—Albert C. Johnston

[57] ABSTRACT

A slit exposure device movable back and forth in a path parallel to a stationary original for projecting an image of the original in linear portions onto a moving photosensitive element in belt form has a lamp for illuminating the original, an optical system, at least two interconnected belt deflecting rollers and a drive for moving these rollers with the optical system along and parallel to the object plane. At least one of the deflecting rollers deflects the photosensitive element counterclockwise and at least one of them deflects it clockwise from its original direction of movement, and the optical system projects the image in linear portions onto the photosensitive element at a location within the path formed by and between the deflected portions of the photosensitive element.

4 Claims, 3 Drawing Figures

SLIT EXPOSURE DEVICE

This invention relates to a slit exposure device for projecting an image of an original onto a moving photosensitive element in belt form, of a type which comprises a stationary object plane, an exposure device for illuminating the original, and an optical system movable back and forth parallel to the object plane.

Various forms of slit exposure devices of the type mentioned are known, and generally are for use in copying machines. The known devices typically employ optical systems that project an image of a linear portion of the original onto the photosensitive element which, for example, is an endless photoconductive belt.

At present there is a growing interest in optical systems, particularly for use in lower-volume copying machines, which make use of several rows of small lenses, each of which rows forms an erect image of a small portion of the length of the original. If the small lenses are positioned correctly relative to each other, a mosaic of partial images is formed with invisible or hardly visible transitions between the images. Also, optical systems are commercially available which contain a plurality of imaging glass fibers bonded together in a few rows in an assembly having more or less the form of a ruler of which the two large surfaces are parallel to the optical axes of the glass fibers. Such systems of imaging glass fibers, which in principle form the same type of image as the rows of small lenses, are marketed under the name "Selfoc arrays" and the like.

A slit exposure device utilizing an array of imaging glass fibers is described in U.S. Pat. No. 4,129,373. In that device three reflective surfaces are constituted by two prisms so that a right-reading image of a stationary original is projected in linear portions onto a photoconductive element moving parallel to the plane of the original. In operation the optical system of the imaging fiber array and prisms is moved at half the speed of the photoconductive element past the original.

Such a slit exposure device is not always practicable, because the glass fiber array forms an image at a very short distance, e.g. 15 mm, from the outer ends of the fibers. Due to this small image space the use of three reflective surfaces with two prisms does not enable use of an image width larger than approximately 3 mm, because at a larger image width the prisms would be oversized and would not fit in the image space. Consequently, a device employing two prisms with three reflective surfaces can be used only in cases where the amount of light required is comparatively small.

U.S. Pat. No. 3,955,888 discloses a slit exposure device employing a glass fiber array without reflective surfaces, for forming an image of a stationary original in linear portions on a photoconductive element. In this device the photoconductive element must be stopped during exposure. Consequently, when using a comparatively long photoconductive element such, for example, as an endless belt, relatively prolonged influences of the charging unit, developing unit and transfer unit of the copying machine cause local irregularities on the photoconductive element and, as a result, also on the images formed. In addition, the exposure device produces a mirror image. This does not present difficulties if the image after development is transferred to a sheet of receiving material without an intermediate transfer, but if an intermediate transfer of the image is utilized an odd number of reflective surfaces must be employed in order to obtain a right-reading image on the photosensitive element.

The principal object of the present invention is to provide a slit exposure device of the type first above mentioned which does not have the disadvantages of the known slit exposure devices referred to above.

According to this invention, in a slit exposure device or apparatus comprising a stationary object plane, means for illuminating the original to be copied and an optical system movable back and forth in a path parallel to the object plane for projecting an image of the original onto a moving photosensitive element in belt form, the device is provided with at least two interconnected belt deflecting rollers and with drive means for moving these rollers along the object plane in parallel with the optical system, so that at least one of the deflecting rollers deflects the photosensitive element in the counterclockwise direction from its original direction of movement and at least one of the deflecting rollers deflects the photosensitive element in the clock-wise direction, and the optical system projects the image in linear portions onto the photosensitive element at a location within the path formed by the portions of the photosensitive element on and between the deflecting rollers.

A slit exposure device according to this invention provides important advantages over the known slit exposure devices. On the one hand, the photosensitive belt need not be stopped during exposure, and on the other hand the formation of a right-reading image on the photosensitive surface necessitates one mirror only, thus requiring less space than a construction employing three reflective surfaces. Furthermore, the device according to the invention is advantageous in that critical setting of a complete image plane and provisions for keeping a large surface area of the photosensitive element taut and flat are not necessary. It is a much simpler matter to keep the photosensitive element taut over a relatively small surface area on or between the deflecting rollers. Moreover, the slit exposure device according to the invention retains the advantage that at the reproduction ratio of 1:1, which is the most usual ratio, the speed of the scanning device is half that of the photosensitive belt outside the deflecting rollers.

In a slit exposure device of this invention the drive means for the deflecting rollers can be coupled to the drive of the photosensitive belt in such a manner that the speed of the movement of the deflecting rollers alongside the object plane is maintained at half the speed of the photosensitive belt outside the deflecting rollers, even when the latter speed changes. This preferably is accomplished by providing the deflecting rollers with drive means which comprise a pulley or a gear coupled by disconnectable clutch means to the shaft of one of the deflecting rollers and comprise a substantially stationary guide member arranged parallel to the object plane in non-slipping contact with the pulley or the gear.

The above mentioned and other objects, features and advantages of the invention will be further evident from the following description and the accompanying drawings of an illustrative embodiment of the invention. In the drawings.

Figure 1:
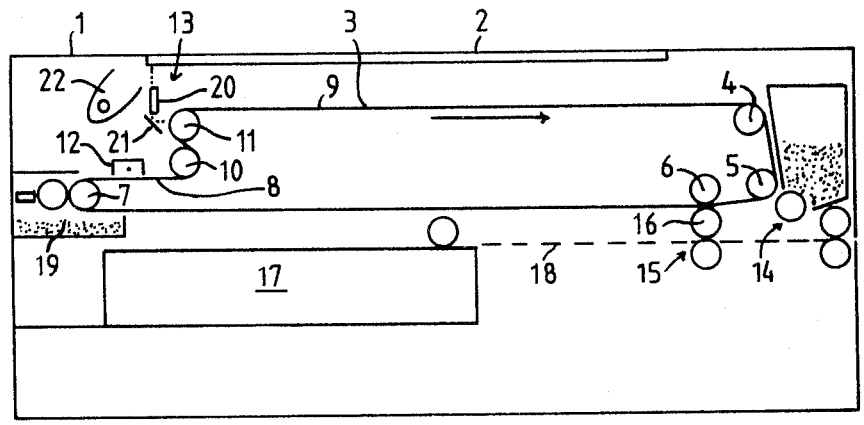
FIG. 1 is a schematic cross section through an electrophotographic copying machine comprising a slit exposure device according to the invention.

The copying machine illustrated in FIG. 1 comprises an exposure plate 2 fixed in its upper surface 1. Disposed at some distance below the exposure plate is an endless photoconductive belt 3 which circulates in the direction of the arrow over a plurality of transport rollers 4,5,6 and 7. The belt traverses two paths 8 and 9 disposed in planes parallel to the exposure plate, and it is deflected into the form of an S, curving from path 8 and then back into path 9, by being passed about two superimposed deflecting rollers 10 and 11. The belt moves past roller 7 into path 8, passes a charging unit 12 and then moves through a slit exposure system of which the deflecting rollers 10 and 11 constitute a part, and which is generally designated as 13. The belt moving from the upper flight or path 9 passes a magnetic brush developing unit 14 for development of the latent image formed by the exposure with a one-component magnetizable developing powder, after which the belt passes through a transfer and fusing unit 15 which comprises a roller 16 coated with silicone rubber. Powder images are transferred from the photoconductive belt to the roller 16 which in turn transfers the powder images to sheets of paper that are fed from a storage tray 17 located beneath the belt and are conveyed past roller 16 as indicated by the broken line 18. Finally, the photoconductive belt passes through a magnetic cleaning unit 19, before again passing the charging unit 12.

A focussing glass fiber array 20 composed of several rows of imaging glass fibers is arranged perpendicularly to the exposure plate 2 and near the deflecting rollers 10 and 11. The rows of imaging glass fibers together are capable of reproducing at a 1:1 reproduction ratio a linear portion of an original placed on the exposure plate. A mirror 21 inclined at an angle of 45° to the exposure plate is arranged at the side of the focussing glass fiber array facing away from the exposure plate, so that the mirror 21 will project the image formed by the array perpendicularly onto the photoconductive belt, to a location on a deflected portion of the belt where the belt on the upper deflecting roller 11 moves perpendicularly to the exposure plate.

In the drawing the image is indicated as being projected from the mirror to a spot where the belt is passing substantially vertically on the deflective roller 11. It must be noted, however, that another location of the belt on or between the deflecting rollers 10 and 11 can be utilized for receiving the projected image in accordance with the invention. For instance, by properly orienting the mirror 21 the image can be projected onto the belt at a location within its path between the deflecting rollers, which rollers if desired may be arranged in another position relative to one another. Moreover, it is not essential that the plane of the image be perpendicular to the exposure plate, as another angle for this plane may be utilized to the extent that adaptation of the position of the mirror permits the image to be projected perpendicularly onto the photoconductive belt.

Disposed next to the focussing glass fiber array is a light source 22 which comprises a tubular light source and a narrow reflector by which the light is concentrated to create a linear bundle of rays for reflection from an object on the exposure plate 2 into the field of view of the focussing glass fiber array.

Figure 2:
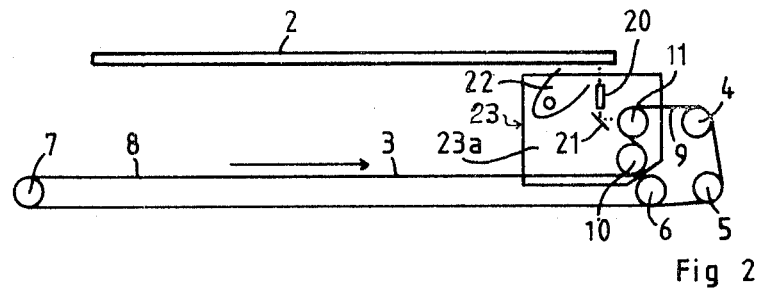
FIG. 2 is a view of the photoconductive belt and the slit exposure device of FIG. 1, but showing the exposure device in another position.

The belt deflecting rollers 10 and 11, the focussing glass fiber array 20, the mirror 21 and the light source 22 together constitute part of the slit exposure device 13 and are all mounted between two plates 23a and 23b which are arranged parallel to each other, with connecting rods mounted between the plates, to form part of a carriage 23 that is movable on rails (not shown) back and forth in a path parallel to the exposure plate. The backward plate 23a of the carriage is shown in FIG. 2, and the forward plate 23b thereof is shown in FIG. 3.

During the formation of an image, the carriage 23 with the slit exposure device 13 thereon is moved past an original on the exposure plate (to the right as viewed in FIGS. 1 and 3) at half the speed at which the endless photoconductive belt 3 is driven during its circulation in the machine. The formation of the image will have been completed when the slit exposure device has reached its position shown in FIG. 2, and the exposure device is then returned to its starting position shown in FIG. 1. The formation of the image of course can be terminated at an earlier stage if the length of the original is smaller than the maximum length that can be scanned along the path of the exposure device, for which purpose means that are known per se, such for instance as a mobile switch arranged next to the object plane of the original so as to be contacted by a cam on the carriage, can be employed for reversing the direction of movement of the carriage 23 when the original has been fully scanned.

Figure 3:
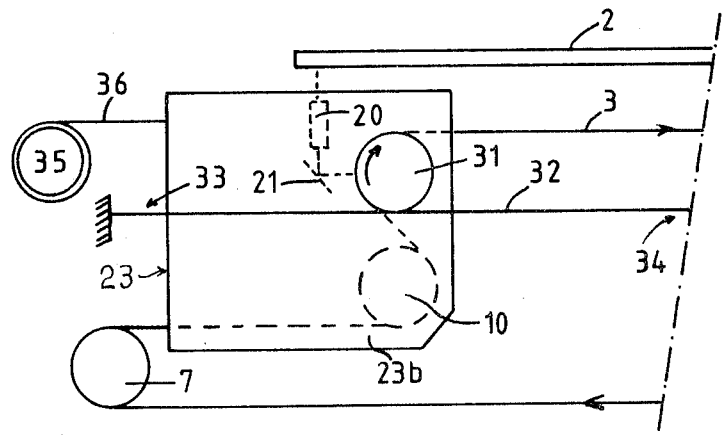
FIG. 3 is a diagram of a drive for the deflecting rollers of the slit exposure device of FIGS. 1 and 2.

The back and forth movement of the slit exposure device can be effected by suitable drive means connected for movement with the belt 3, as shown schematically in FIG. 3. As there indicated, for moving the deflecting rollers including the carriage attached to them and the rest of the slit exposure device along the object plane 2, a pulley 31 is fitted to rotate freely on the shaft of the upper deflecting roller 11 at the outer side of plate 23b of the carriage 23. The pulley 31 is provided with a magnetic clutch capable of coupling it to the shaft of a deflecting roller 11. Since suitable magnetic clutches in various forms of construction are well known in the art, the clutch is not shown or described here in detail.

In the embodiment illustrated, the pulley 31 has a rope 32 wound about it with legs 33 and 34 of the rope crossing each other at the underside of the pulley and extending from it in opposite directions to ends which are fixed to opposite sides of the copying machine at a level such that the rope legs extend in a path parallel to the direction of movement of the slit exposure device. The diameter of a cross section through the tread of the pulley 31 is equal to that of the deflecting roller 11. A spiral or volute spring 35 located near the backward limit of the path of the carriage 23 (to the left in the drawings) has its inner end fixed relative to the copying machine and has its other end attached by a cable 36 to the carriage 23 of the slit exposure device.

In alternative embodiments of the drive for the deflecting rollers, the pulley 31 can be replaced by a gear, and the rope 32 by a gear rack fitted in the copying machine at the location of the rope legs and pressed at its lower side so as to be engaged non-slippably against the gear. The spiral spring 35 can be replaced by a tension spring.

The operation of the drive means with the pulley-rope combination is equivalent to that employing the gearrack combination, and is as follows:

The photoconductive belt 3 is driven continuously by a motor coupled to the transport roller 6, but which as well can be coupled to any of the transport rollers 4, 5 and 7, or to the roller 16 coated with silicone rubber. When pulley 31 is coupled with the shaft of the deflecting roller 11, the circulating photoconductive belt 3 causes pulley 31 to rotate in the direction of the arrow (FIG. 3) and to move forwardly (to the right) along the rope 32 together with the rest of the slit exposure device on the carriage connected to the pulley. The rope will then uncoil from pulley 31 at the backward side (leg 33) and coil onto the pulley at the forward side (leg 34). The speed at which the pulley moves along the object plane 2 is exactly half the speed of circulation of the photoconductive belt.

While the pulley 31 is coupled to the shaft of the deflecting roller 11, so during its movement to the right as viewed in the drawings, the photoconductive belt is subjected to imagewise exposure. Upon completion of the exposure, pulley 31 is uncoupled from the roller shaft by deenergization of the magnetic clutch, and the spring 35 then retracts the slit exposure device completely to the starting position.

In a further alternative embodiment of the drive, the deflecting rollers 10 and 11 are closely spaced and a gear is fitted on the shaft of each of these rollers. In that case a rack provided with teeth on opposite sides thereof is fitted between the two gears in non-slipping engagement with each gear. The operation is equivalent to that of the other drives.

The slit exposure device of the invention enables a simple procedure for removal and replacement of the endless photoconductive belt. For that purpose, a holder to receive roller 11 can be provided to the right in the copying machine, near the transport roller 4. The carriage bearing the optical system can be moved toward the holder to a location in which the deflecting roller 11 can be disconnected from the carriage plates 23a and 23b and fixed temporarily in the holder. The carriage and the rest of the optical system, including the deflecting roller 10, can then be moved to the left, as a result of which roller 11 will be released from the belt 3 and the belt becomes loose. This facilitates removal of a used photoconductive belt from the rollers 4, 5, 6, 7 and 10 and fitting of a fresh belt onto these rollers, after which the carriage is returned to the holder for return of the roller 11 into its working position tight against the fresh belt.

We claim:

1. A slit exposure device for projecting an image of an original onto a moving photosensitive belt, comprising a stationary object plane, means for illuminating the original, an optical system movable back and forth in a path parallel to said object plane, at least two interconnected belt deflecting rollers and drive means for moving said rollers along and parallel to the object plane with the optical system, at least one of said rollers deflecting the photosensitive belt counterclockwise from its original direction of movement and at least one of said rollers deflecting the belt in clockwise direction, said optical system being arranged to project the image of an original in linear portions onto the photosensitive belt at a location within the path formed by the portions of the belt on and between said deflecting rollers.

2. A slit exposure device according to claim 1, said drive means comprising a pulley or a gear coupled by disconnectable clutch means to the shaft of one of said deflecting rollers for rotation therewith and substantially stationary guide means arranged at least largely parallel to said object plane and in non-slipping engagement with said pulley or gear.

3. A slit exposure device according to claim 2, said drive means comprising a said pulley and said guide means comprising a rope wound about said pulley and having taut leg portions extending in opposite directions from said pulley along a path substantially parallel to the path of said optical system.

4. A slit exposure device according to claim 1, 2, or 3, said illuminating means, said optical system and said belt deflecting rollers being mounted on a carriage that is movable back and forth in a path parallel to said object plane, said drive means being operative to move said carriage in one direction along said object plane for exposure of an original, and spring means for returning said carriage in the opposite direction upon disconnection of said drive means.

* * * * *